(12) United States Patent
Fukudome (10) Patent No.: US 10,384,530 B2
(45) Date of Patent: Aug. 20, 2019

(54) IN-WHEEL MOTOR UNIT

(71) Applicant: TOYOTA JIDOSHA KABUSHIKI KAISHA, Toyota-shi, Aichi-ken (JP)

(72) Inventor: Hideki Fukudome, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/688,273

(22) Filed: Aug. 28, 2017

(65) Prior Publication Data

US 2018/0056775 A1 Mar. 1, 2018

(30) Foreign Application Priority Data

Aug. 29, 2016 (JP) ................................. 2016-167007

(51) Int. Cl.
*B60K 7/00* (2006.01)
*B60K 17/04* (2006.01)
*B60L 15/20* (2006.01)

(52) U.S. Cl.
CPC .......... *B60K 7/0007* (2013.01); *B60K 17/043* (2013.01); *B60K 2007/0038* (2013.01); *B60K 2007/0061* (2013.01); *B60K 2007/0092* (2013.01); *B60L 15/20* (2013.01); *B60L 2220/42* (2013.01); *B60Y 2306/03* (2013.01)

(58) Field of Classification Search
CPC .......... B60K 7/0007; B60K 2007/0038; B60K 2007/0061; B60K 17/043
See application file for complete search history.

(56) References Cited

U.S. PATENT DOCUMENTS 7,717,203 B2 * 5/2010 Yoshino ............... B60K 7/0007
180/65.51
8,944,196 B2 * 2/2015 Yamada .................... B60B 7/00
180/65.51
(Continued)

FOREIGN PATENT DOCUMENTS

DE 19716538 A1 * 10/1998 ........... B60K 7/0007
DE 19716538 A1 10/1998
(Continued)

OTHER PUBLICATIONS

Communication dated Jan. 25, 2018, from European Patent Office in counterpart application No. 17185167.8.
(Continued)

*Primary Examiner* — James A Shriver, II
*Assistant Examiner* — Steve Clemmons
(74) *Attorney, Agent, or Firm* — Sughrue Mion, PLLC (57) ABSTRACT

An in-wheel motor unit comprises a housing, a motor, a speed reducer including a rotating body and an output shaft fixed to the rotating body and penetrating the housing to extend to outside of the housing in an axle outward direction, and a hub bearing including a bearing part and a hub part integrated with the bearing part. A part of the output shaft positioned at an axle outward direction side of the rotating body is supported only by the bearing part. A part of the bearing part is positioned inside the housing. Inside of this part is disposed a first seal member which fluid-tightly seals a gap between an inner race and an outer race at a position positioned at an axle inward direction side of a group of rolling elements.

4 Claims, 3 Drawing Sheets

(56) References Cited

U.S. PATENT DOCUMENTS

| | | | |
|---|---|---|---|
| 9,233,602 B2* | 1/2016 | Mair | B60K 7/0007 |
| 9,490,679 B2* | 11/2016 | Yamamoto | B60K 7/00 |
| 9,884,549 B2* | 2/2018 | Kanatani | B60K 7/0007 |
| 2005/0028640 A1 | 2/2005 | Laurent et al. | |
| 2007/0181357 A1 | 8/2007 | Saito et al. | |
| 2011/0115343 A1 | 5/2011 | Walser et al. | |
| 2012/0161498 A1* | 6/2012 | Hansen | B60K 7/0007 |
| | | | 301/6.5 |

FOREIGN PATENT DOCUMENTS

| | | |
|---|---|---|
| EP | 1 719 656 A1 | 11/2006 |
| JP | 2005-231564 A | 9/2005 |
| JP | 2009012523 A | 1/2009 |
| JP | 2011-517638 A | 6/2011 |
| JP | 2013-147216 A | 8/2013 |
| JP | 2015-020707 A | 2/2015 |
| JP | 2016073061 A | 5/2016 |
| JP | 2016-130572 A | 7/2016 |
| KR | 10-2014-0132619 A | 11/2014 |

OTHER PUBLICATIONS

Communication dated Jul. 19, 2018 issued by the Korean Intellectual Property Office in counterpart application No. 10-2017-0108517.

* cited by examiner

100; # IN-WHEEL MOTOR UNIT

TECHNICAL FIELD

The present invention relates to an in-wheel motor unit configured to drive a wheel by a motor disposed inside the wheel.

BACKGROUND ART

An in-wheel motor unit (a wheel driving apparatus) configured to drive a wheel by a motor disposed inside the wheel has conventionally been known as one form of an electric automobile (refer to FIG. 2 of Japanese Patent Application Laid-Open (kokai) No. 2016-073061.).

This in-wheel motor unit comprises the motor and a speed reducer configured to change (increase) torque of the motor to output. The speed reducer includes a rotating body (for example, a counter gear) configured to be rotated by the motor, and an output shaft fixed to the rotating body. The output shaft is rotatably supported with respect to the housing by a bearing. On one end part of the output shaft is provided a hub bearing which includes a bearing part and a hub part integrated with the bearing part. When the motor is supplied with electric power, torque of the motor is changed (increased) via the speed reducer, and the changed (increased) torque is transmitted to the wheel fixed to the hub part of the hub bearing, thereby the wheel is rotated.

SUMMARY OF THE INVENTION

In general, in a vehicle comprising the in-wheel motor unit as described above, a brake rotor is disposed in a vicinity of the hub bearing (typically, the brake rotor is fixed to the hub part.). Therefore, when a lubricating oil is used as a lubricating agent used for the hub bearing, there is a possibility that this lubricating oil causes an undesirable influence on a brake performance in a case when the lubricating oil enters the brake rotor.

Accordingly, the hub bearing is usually disposed outside the housing (for example, a carrier) which accommodates the motor and the speed reducer (strictly speaking, a part of the speed reducer). Specifically, the output shaft of the speed reducer fluid-tightly penetrates a wall surface of the housing, and the hub bearing is provided on the output shaft on an outside of the housing. Further, a grease having a higher viscosity than the lubricating oil and hard to leak is used as the lubricating agent for the hub bearing, and the lubricating oil superior in a lubricating performance than the grease is used as the lubricating agent for an inside of the housing.

It is desired to shorten a length of the in-wheel motor unit in an axle direction. The present invention is made in order to satisfy a requirement above. That is, one of objects of the present invention is to provide an in-wheel motor unit capable of shortening a length thereof in an axle direction while maintaining a low possibility that a lubricating agent used for the in-wheel motor unit influences on a brake performance.

An in-wheel motor unit (1) of the present invention comprises;
 a housing (10) supported by a vehicle body and disposed inside a wheel of a vehicle;
 a motor (20) supported by the housing (10) and accommodated inside the housing (10);
 a speed reducer (30) including a rotating body (34) with a cylindrical shape configured to be rotated by the motor (20) on an inside of the housing (10) and lubricated by a lubricating oil and an output shaft (36) fixed to or integrated with the rotating body (34) and penetrating an opening (12) provided on a wall surface (10a) of the housing (10) to extend to outside of the housing (10) in an axle outward direction;
 a hub bearing (40) provided on a part of the output shaft (36) positioned at an axle outward direction side of the rotating body (34), allowing a rotation of the wheel while supporting a vehicle weight, and including one or a plurality of groups of rolling elements (40c) comprised of a plurality of rolling elements disposed in a circumferential direction thereof; and
 a first seal member (50),
 the in-wheel motor unit (1) rotating the wheel by transmitting torque of the motor (20) to the wheel via the speed reducer (30) and the hub bearing (40).

Specifically, the hub bearing (40) includes a bearing part (42) lubricated by a grease with a higher viscosity than the lubricating oil and a hub part (44) to which a brake rotor (90) disposed outside the housing (10) is fixed, wherein the bearing part (42) and the hub part (44) are integrated with each other,
 a part of the bearing part (42) is positioned inside the housing (10) via the opening (12),
 the part of the output shaft (36) positioned at the axle outward direction side of the rotating body (34) is rotatably supported with respect to the housing (10) only by the bearing part (42).

Further, the first seal member (50) is disposed inside the part of the bearing part (42), fluid-tightly seals a gap between an inner race (40a) and an outer race (40b) of the hub bearing (40) at a position positioned at an axle inward direction side of the one or a plurality of groups of the rolling elements (40c) of the hub bearing (40), and divides an inside of the housing (10) into a first space (S1) where the motor (20) and the rotating body (34) are disposed and a second space (S2) surrounded by the inner race (40a), the outer race (40b), the first seal member (50), and a virtual plane including the opening (12) of the housing (10).

In the present invention, a part of the bearing part of the hub bearing is positioned inside the housing. Therefore, the length of the in-wheel motor unit in the axle direction (hereinafter, also simply referred to as a "length in the axle direction") can be shortened in comparison to a conventional configuration (that is, a configuration where the hub bearing is disposed outside the housing). In addition, in the present invention, the first seal member fluid-tightly seals the gap between the inner race and the outer race at the position positioned at the axle inward direction side of one or a plurality of groups of the rolling elements. Thereby, an inside of the housing is divided into the first space and the second space. The first space is a space where the motor and the rotating body are disposed, that is, a space where the lubricating oil lubricating the rotating body is present. On the other hand, the second space is a space surrounded by the inner race, the outer race, the first seal member, and the virtual plane including the opening of the housing, that is, a space where the grease lubricating the bearing part is present.

According to the configuration stated above, a possibility that the lubricating oil present in the first space enters the second space can be reduced by the first seal member even when a part of the bearing part is positioned inside the housing. Therefore, a possibility that the lubricating oil enters the brake rotor fixed to the hub part of the hub bearing via the second space can be reduced. On the other hand, the grease present in the second space is hard to leak into the brake rotor due to a relatively high viscosity thereof. That is, the grease as the lubricating agent for the hub bearing has an extremely low possibility to influence on the brake performance, same as the grease in the conventional hub bearing. Therefore, in the present invention, it becomes possible to shorten the length in the axle direction while maintaining a low possibility that the lubricating agent (the lubricating oil and the grease) used for the in-wheel motor unit influences on the brake performance.

Further, in a conventional configuration, the bearing was disposed between the rotating body and the hub bearing, and this bearing played a role of "rotatably supporting the output shaft with respect to the housing". However, in the present invention, the part of the output shaft positioned at the axle outward direction side of the rotating body is rotatably supported with respect to the housing only by the bearing part (the hub bearing). That is, the hub bearing plays the aforementioned role as well. Therefore, the bearing disposed between the rotating body and the hub bearing becomes unnecessary. Hence, the length in the axle direction can be further shortened by a length of this bearing, and a number of parts can be reduced as a whole.

In another aspect of the in-wheel motor unit (1) according to the present invention, a first recessed part (35a) recessing in an axle inward direction is provided on one end surface (34a) in the axle outward direction of the rotating body (34), and one end part in the axle inward direction of the bearing part (42) is positioned in the first recessed part (35a).

According to this configuration, the length in the axle direction can be further shortened by a length by which one end part of the bearing part is positioned in the first recessed part.

In another aspect of the in-wheel motor unit (1) according to the present invention, the bearing part (42) has a cylindrical shape where at least more than or equal to two groups of the rolling elements (40c) are disposed side by side in an axle direction, the output shaft (36) is supported only by the hub bearing (40), and a part of the output shaft (36) positioned at the axle inward direction side of the rotating body (34) is not supported by any bearings.

In this configuration, a cantilever structure in which only the hub bearing supports the output shaft is adopted. Since the bearing part has a cylindrical shape, a contact area (a length in an axial direction) in which the inner race is in contact with the output shaft is larger than a "contact area in which an inner race of a common bearing having only one group of rolling elements disposed inside a conventional housing is in contact with an output shaft". Therefore, even when the cantilever structure is adopted, the hub bearing can stably support the output shaft, and rattling of the output shaft can be suppressed. As a result, it becomes possible to suppress noise and vibration generated due to the rattling of the output shaft. Besides, according to this configuration, a number of bearings supporting the output shaft can be reduced in comparison to a "both-ends-supported structure in which the output shaft is rotatably supported by a pair of bearings disposed with the rotating body sandwiched". Therefore, the length in the axle direction can be further shortened by a length of the bearing reduced in number, and a number of parts can be reduced as a whole.

In another aspect of the in-wheel motor unit (1) according to the present invention, a part of the output shaft (136) positioned at the axle inward direction side of the rotating body (34) is rotatably supported with respect to the housing (10) by a taper roller bearing (184).

When a type of a bearing supporting a part of the output shaft positioned at the axle inward direction side of the rotating body is a ball bearing, the output shaft may move in its axial direction during operation to cause rattling. However, in the above configuration, a type of the bearing supporting the output shaft is the taper roller bearing. Therefore, it can be suppressed that the output shaft moves in its axial direction, and as a result, the rattling of the output shaft, and the noise and the vibration due to the rattling can be suppressed.

In this case, a second recessed part (35b) recessing in the axle outward direction is provided on an other end surface (34b) in the axle inward direction of the rotating body (34), one end part in the axle outward direction of the taper roller bearing (184) is positioned in the second recessed part (35b).

In general, the taper roller bearing is longer in length in the axial direction than the ball bearing. However, in the above configuration, one end part of the taper roller bearing is positioned in the second recessed part. Therefore, the length in the axle direction can be shortened by a length by which this one end part is positioned in the second recessed part. Therefore, the in-wheel motor unit can be prevented from becoming longer owing to using the taper roller bearing. As a result, suppressing the rattling of the output shaft and preventing the in-wheel motor unit from becoming longer in the axle direction can be both realized.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

First Embodiment

Figure 1:
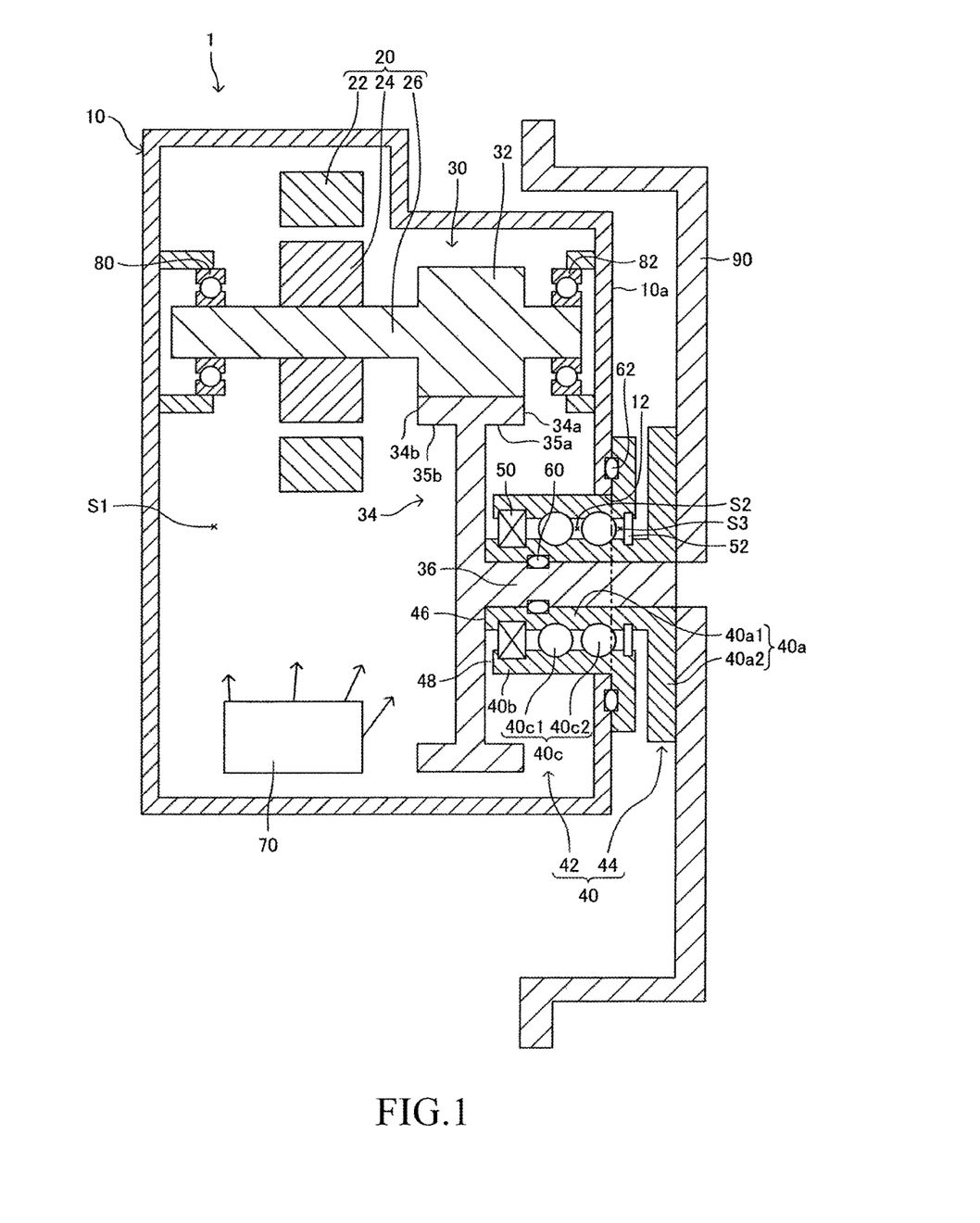
FIG. 1 is a schematic sectional view of an in-wheel motor unit according to a first embodiment of the present invention when seen from a front-rear direction of a vehicle.

As shown in FIG. 1, an in-wheel motor unit 1 according to a first embodiment of the present invention (hereinafter, also simply referred to as a "motor unit 1".) comprises a housing 10, a motor 20, a speed reducer 30, a hub bearing 40, an oil seal member 50, O-rings 60, 62, and an oil supply apparatus 70. A rightward direction of each of FIG. 1 to FIG. 3 corresponds to an axle outward direction.

The housing 10 is connected to a suspension arm (illustration omitted), and is disposed inside a wheel (illustration omitted) of a vehicle. The housing 10 has a substantially rectangular parallelepiped shape. An opening 12 is provided on a wall surface 10a in the axle outward direction of the housing 10.

The motor 20 is accommodated inside the housing 10. The motor 20 is a three-phase brushless motor, and includes a stator 22, a rotor 24, and a driving shaft 26. The stator 22 is supplied with electric power from a power source apparatus (illustration omitted) of the vehicle via a motor controlling apparatus (illustration omitted). The stator 22 makes the rotor 24 generate torque with the electric power supplied. The motor 20 rotates the wheel by this torque. That is, the motor 20 functions as an apparatus to generate torque for driving the wheel. In addition, the rotor 24 is rotated by a force acted on the wheel by a road surface. This rotation of the rotor 24 enables the motor 20 to generate electric power. This electric power is supplied to the power source apparatus (that is, this electric power is regenerated) via the motor controlling apparatus. That is, the motor 20 functions also as a generator. The motor 20 is rotated by the motor controlling apparatus in a positively rotating direction as well as in a reverse rotating direction. Hereinafter, a description will be made by defining a rotating direction of the motor 20 in a case when the motor 20 applies torque to the wheel for moving the vehicle forward as the positively rotating direction.

The driving shaft 26 extends in the axle direction (a left-right direction of a vehicle body), and is coaxially arranged with the rotor 24. The driving shaft 26 is fixed to (or integrated with) the rotor 24, and integrally rotates with the rotor 24. The driving shaft 26 is rotatably supported with respect to the housing 10 by ball bearings 80, 82 arranged inside the housing 10. A driving gear 32 (mentioned later) is fixed to (or integrated with) the driving shaft 26 between the rotor 24 and the bearing 82.

The speed reducer 30 includes the driving gear 32, a driven gear 34 as a "rotating body", and an output shaft 36. The driven gear 34 is also referred to as a counter gear. The driving gear 32 is coaxially arranged with the driving shaft 26, and integrally rotates with the driving shaft 26. The driven gear 34 has a larger diameter than the driving gear 32, and rotates by being meshed with the driving gear 32. The driven gear 34 has a substantially cylindrical shape, and includes a surface 34a as "one end surface" in its axle outward direction (in the rightward direction in FIG. 1) as well as a surface 34b as an "other end surface" in its axle inward direction (in the leftward direction in FIG. 1). The driven gear 34 is coaxially arranged with a central axis of rotation of the wheel.

A first recessed part 35a recessing in the axle inward direction is provided on the surface 34a. The first recessed part 35a has a substantially cylindrical shape, and the central axis thereof coincides with the central axis of the driven gear 34. Similarly, a second recessed part 35b recessing in the axle outward direction is provided on the surface 34b. The second recessed part 35b has a substantially same shape as the first recessed part 35a, and the central axis thereof coincides with the central axis of the driven gear 34. A sum of a height of the first recessed part 35a (that is, a length in the axle direction) and a height of the second recessed part 35b is shorter than a length of the driven gear 34 in the axle direction.

The output shaft 36 extends in the axle direction and is coaxially arranged with the driven gear 34. That is, the output shaft 36 is coaxially arranged with the central axis of rotation of the wheel. One end in the axle inward direction of the output shaft 36 is fixed to (or integrated with) a bottom surface of the first recessed part 35a of the driven gear 34. Thereby, the output shaft 36 integrally rotates with the driven gear 34. The output shaft 36 penetrates the wall surface 10a via the opening 12 of the housing 10 to extend to outside the housing 10. As is obvious from the description above, the driving gear 32, the driven gear 34, and a part of the output shaft 36 are disposed inside the housing 10.

The hub bearing 40 is a member formed by integrating a bearing part 42 and a hub part 44 with each other. In other words, the hub bearing 40 includes the bearing part 42 and the hub part 44, wherein the bearing part 42 and the hub part 44 are integrated with each other. The hub bearing 40 includes an inner race 40a, an outer race 40b, two groups of rolling elements (two groups of bearing balls) 40c, and a retainer (illustration omitted). The inner race 40a includes a cylinder part 40a1 and a flange part 40a2. The bearing part 42 is comprised of the cylinder part 40a1 of the inner race 40a, the outer race 40b, two groups of the rolling elements 40c, and the retainer. The hub part 44 is comprised of the flange part 40a2 of the inner race 40a.

First, a description about the bearing part 42 will be made. The bearing part 42 is a member formed by integrating two bearings with each other. The bearing part 42 has a substantially cylindrical shape, and extends in the axle direction. Specifically, the cylinder part 40a1 of the inner race 40a has a substantially cylindrical shape, and extends in the axle direction. The cylinder part 40a1 is fixed to (or integrated with) the output shaft 36 to integrally rotate with the output shaft 36. An end surface 46 in the axle inward direction of the cylinder part 40a1 is in contact with the bottom surface of the first recessed part 35a of the driven gear 34. The cylinder part 40a1 has a smaller diameter than the opening 12 of the housing 10, and penetrates the wall surface 10a via the opening 12. It should be noted that the end surface 46 may be slightly apart from the bottom surface of the first recessed part 35a of the driven gear 34 as long as the end surface 46 is positioned in the first recessed part 35a.

The outer race 40b has a substantially cylindrical shape surrounding a circumference of the cylinder part 40a1, and extends in the axle direction. An end surface 48 in the axle inward direction of the outer race 40b is positioned in the first recessed part 35a of the driven gear 34. That is, the end surface 48 is slightly apart from the bottom surface of the first recessed part 35a. The outer race 40b penetrates the wall surface 10a via the opening 12, and comes into contact with a surface forming the opening 12. An end part in the axle outward direction of the outer race 40b has a flange shape, and is fixed to the wall surface 10a on an outside of the housing 10.

Two groups of the rolling elements 40c includes a group of the rolling elements 40c1 positioned in the axle inward direction and a group of the rolling elements 40c2 positioned in the axle outward direction. The group of the rolling elements 40c1 and the group of the rolling elements 40c2 are disposed side by side in the axle direction at an interval. Each group of the rolling elements 40c1, 40c2 is comprised of a plurality of bearing balls. The plurality of bearing balls are rollably disposed at intervals in a circumferential direction in a space between the inner race 40a and the outer race 40b. The retainer retains each of the bearing balls so that the bearing balls do not come into contact with each other in the circumferential direction and the axial direction.

Next, a description about the hub part 44 will be made. The flange part 40a2 of the inner race 40a which constitutes the hub part 44 has a plane part on a plane perpendicular to an axis of the output shaft 36. The flange part 40a2 is integrally connected to one end in the axle outward direction of the cylinder part 40a1. That is, the hub part 44 is positioned outside the housing 10. The output shaft 36 is inserted in a center of the flange part 40a2. The flange part 40a2 is fixed to (or integrated with) the output shaft 36, and integrally rotates with the output shaft 36 as well as the cylinder part 40a1 of the bearing part 42. A brake rotor 90 disposed outside the housing 10 and the wheel are fixed to the flange part 40a2 by a hub bolt (illustration omitted).

As is obvious from the description above, the bearing part 42 penetrates the wall surface 10a via the opening 12 of the housing 10. In other words, a part of the bearing part 42 in the axle inward direction is positioned inside the housing 10. Hereinafter, a part of the bearing part 42 positioned inside the housing 10 is called an "inside-the-housing bearing part 42". Further, one end part in the axle inward direction of the inside-the-housing bearing part 42 is positioned in the first recessed part 35a. In other words, the end surface 46 in the axle inward direction of the inner race 40a and the end surface 48 in the axle inward direction of the outer race 40b are positioned at an axle inward direction side with respect to the surface 34a of the driven gear 34.

As is obvious from FIG. 1, there is no bearing supporting the output shaft 36 disposed between the driven gear 34 and the hub bearing 40. Therefore, the hub bearing 40 plays a role of "rotatably supporting the output shaft 36 with respect to the housing 10" in addition to a usual role of "allowing rotation of the wheel while supporting a vehicle weight". Further, in the present embodiment, the output shaft 36 does not extend to the axle inward direction side of the driven gear 34. Therefore, there is no bearing supporting the output shaft 36 disposed at the axle inward direction side of the driven gear 34. That is, the present embodiment adopts a cantilever structure where the output shaft 36 is supported only by the hub bearing 40.

The oil seal member 50 (a first seal member) is disposed inside the inside-the-housing bearing part 42. The oil seal member 50 includes a metal ring (illustration omitted), a synthetic rubber, and a coil spring, and is used for sealing between two members relatively moving with each other. A structure of the oil seal member 50 is known, and thus a detailed description about the structure will be omitted. The oil seal member 50 fluid-tightly seals a gap between the inner race 40a and the outer race 40b at a position positioned at the axle inward direction side of the group of the rolling elements 40c1. Specifically, a lip part (illustration omitted) positioned at an inner peripheral side of the oil seal member 50 is in slidably contact with the inner race 40a, and a fit part (illustration omitted) positioned at an outer peripheral side is fixed to the outer race 40b. It should be noted that the lip part and the fit part may be provided at opposite sides with each other. In this case, the lip part is in slidably contact with the outer race 40b, and the fit part is fixed to the inner race 40a.

The oil seal member 50 divides an inside of the housing 10 into two spaces, that is, a space S1 as a "first space" and a space S2 as a "second space". It should be noted that strictly speaking, the "inside of the housing 10" means an inside of the housing 10 in a case of assuming the opening 12 to be covered with a plane (shown by a two dot line in FIG. 1) including the wall surface 10a (hereinafter, this plane is also referred to as a "virtual plane".). The space S2 is a space with a substantially cylindrical shape surrounded by the inner race 40a, the outer race 40b, the oil seal member 50, and the virtual plane. In the present embodiment, a part of the groups of the rolling elements 40c is accommodated inside the space S2. The space S1 is a space where the space S2 is removed from the inside of the housing 10. That is, inside the space S1, the motor 20, the ball bearings 80, 82, the driving gear 32, the driven gear 34, a part of the output shaft 36, and the oil supply apparatus 70 are disposed. A lubricating oil circulates inside the space S1, and a grease with a higher viscosity than the lubricating oil is filled inside the space S2 (mentioned later).

It should be noted that a bearing seal 52 is disposed at an axle outward direction side of the group of the rolling elements 40c2. The bearing seal 52 is a seal plate made by fixing a synthetic rubber to a steel plate. The bearing seal 52 seals a gap between the inner race 40a and the outer race 40b on the outside of the housing 10. In the present embodiment, a seal with an LLU type is used as a bearing seal 52. However, other types of seals may be used. For example, a seal with an LLH type or an LLB type or an oil seal member may be used as the bearing seal 52.

A space surrounded by the inner race 40a, the outer race 40b, the oil seal member 50, and the bearing seal 52 is defined as a space S3 for convenience sake. The grease is filled inside the space S3. Thereby, the bearing calls constituting each group of the rolling elements 40c1, 40c2 are lubricated to rotate smoothly. The grease has a higher viscosity than the lubricating oil. Besides, the oil seal member 50 and the bearing seal 52 are provided. Therefore, a possibility that the grease inside the space S3 leaks to the outside (that is, the outside of the space S1 and the housing 10) is extremely low.

As mentioned earlier, the space S3 includes the space S2 since the bearing seal 52 is disposed outside the housing 10. That is, the grease is filled also inside the space S2. It should be noted that the bearing seal 52 may be disposed inside the housing 10. In this case, the space S2 comes to include the space S3.

The o-ring 60 is disposed in a gap between the cylinder part 40a1 of the inner race 40a and the output shaft 36 to fluid-tightly seal the gap. The o-ring 62 is disposed in a gap between the outer race 40b and the wall surface 10a of the housing 10 to fluid-tightly seal the gap.

The oil supply apparatus 70 is disposed inside the space S1, and comprises a reservoir (illustration omitted), a pump, and a supply pipe (for example, refer to Japanese Patent Application Laid-Open (kokai) No. 2015-107709.). In the reservoir, the lubricating oil is stored. The pump draws the lubricating oil by the motor 20 rotating in the positively rotating direction. The lubricating oil drawn is supplied, through the supply pipe, to the motor 20, the driving gear 32, the driven gear 34, and the ball bearings 80, 82. Thereby, the motor 20 is cooled as well as the driving gear 32, the driven gear 34, and the ball bearings 80, 82 are lubricated. The oil supply apparatus 70 is configured such that the lubricating oil after the cooling and the lubricating is brought back again to the reservoir. The lubricating oil circulates inside the space S1 by the oil supply apparatus 70. The oil seal member 50 can reduce a possibility that the lubricating oil inside the space S1 enters the space S2. Besides, the o-rings 60, 62 can reduce a possibility that the lubricating oil inside the space S1 leaks to the outside of the housing 10.

Next a description about an operation of the motor unit 1 will be made. When the stator 22 is supplied with electric power, torque is applied on the rotor 24, and the rotor 24 rotates. When the rotor 24 rotates, the driving gear 32 integrally rotates with the rotor 24 via the driving shaft 26. When the driving gear 32 rotates, the driven gear 34 rotates by being meshed with the driving gear 32. When the driven gear 34 rotates, the output shaft 36 integrally rotates with the driven gear 34. The driving gear 32, the driven gear 34, and the output shaft 36 (that is, the speed reducer 30) decelerates a rotating speed of the rotor 24 to increase torque thereof. The torque increased is transmitted to the wheel fixed to the hub part 44 of the hub bearing 40, and thereby the wheel rotates.

Figure 3:
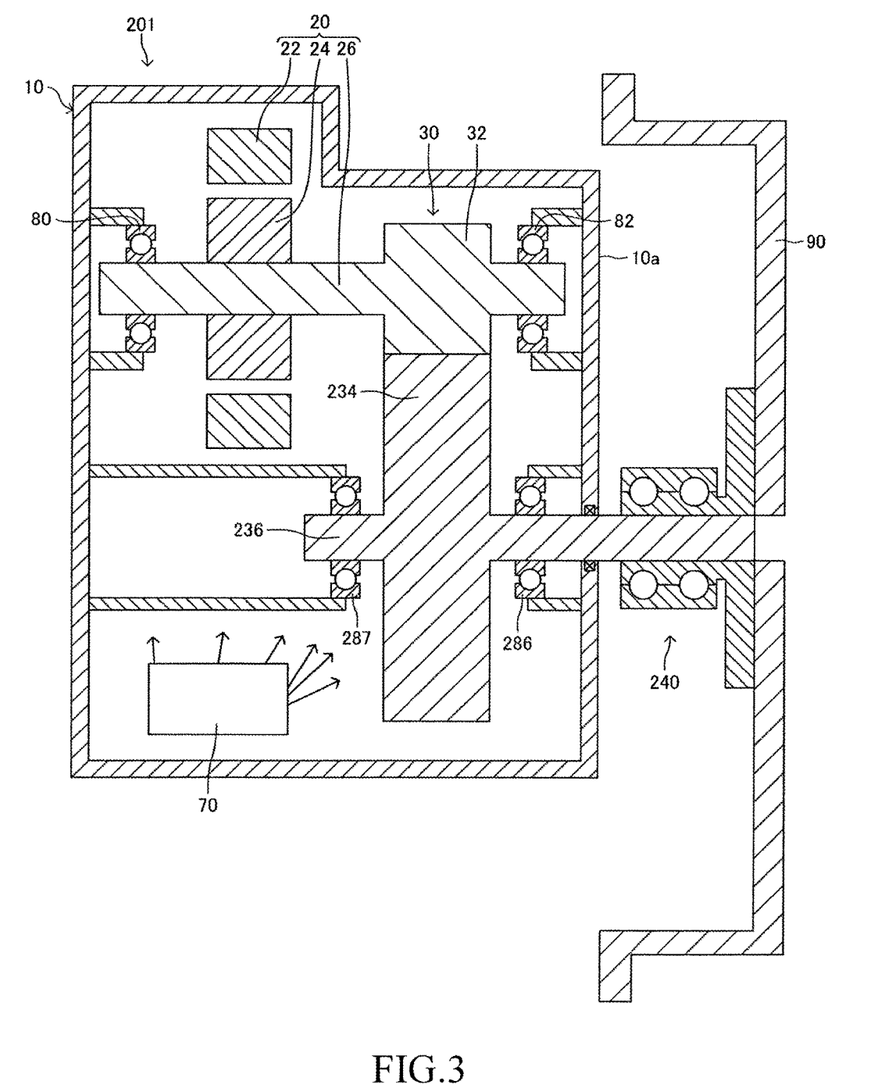
FIG. 3 is a schematic sectional view of a conventional in-wheel motor unit when seen from the front-rear direction of the vehicle.

Effects of the motor unit 1 according to the first embodiment will be described. FIG. 3 is a schematic sectional view of a conventional motor unit 201. As shown in FIG. 3, in the conventional motor unit 201, a hub bearing 240 is disposed outside the housing 10 in order to prevent oil circulating inside the housing 10 from entering the hub bearing 240 inside which the grease is filled.

In contrast, in the motor unit 1, a part of the bearing part 42 of the hub bearing 40 positioned at the axle inward direction side is positioned inside the housing 10. Therefore, a length in the axle direction can be shortened in comparison to a configuration of FIG. 3. In addition, in this motor unit 1, the oil seal member 50 is disposed in a gap between the inner race 40*a* and the outer race 40*b* of the hub bearing 40 at a position positioned at the axle inward direction side of the group of the rolling elements 40*c*1. The oil seal member 50 fluid-tightly seals the gap between the inner race 40*a* and the outer race 40*b*, and thereby divides the inside of the housing 10 into the space S1 (a space where the lubricating oil is present) and the space S2 (a space where the grease is present).

According to the configuration stated above, a possibility that the lubricating oil circulating the space S1 enters the space S2 can be reduced by the oil seal member 50 even when a part of the bearing part 42 is positioned inside the housing 10. Therefore, a possibility that the lubricating oil enters the brake rotor 90 fixed to the hub part 44 of the hub bearing 40 via the space S2 can be reduced. On the other hand, the grease present in the space S2 is hard to leak into the brake rotor 90 due to a relatively high viscosity thereof, and therefore the grease has an extremely low possibility to influence on the brake performance, same as the grease in the conventional hub bearing. Therefore, in this motor unit 1, it becomes possible to shorten the length in the axle direction while maintaining a low possibility that the lubricating agent (the lubricating oil and the grease) used for the motor unit 1 influences on the brake performance.

Further, in the motor unit 201 of FIG. 3, a ball bearing 286 is arranged inside the housing 10, and this ball bearing 286 rotatably supports a part of an output shaft 236 positioned at the axle outward direction side of a driven gear 234 with respect to the housing 10.

In contrast, in the motor unit 1, a part of the output shaft 36 positioned at the axle outward direction side of the driven gear 34 is rotatably supported with respect to the housing 10 only by the bearing part 42 of the hub bearing 40. That is, in the motor unit 1, the hub bearing 40 plays a role of "rotatably supporting the output shaft 36 with respect to the housing 10". Therefore, in the motor unit 1, a bearing corresponding to the ball bearing 286 of the motor unit 201 becomes unnecessary. Hence, the length in the axle direction can be further shortened by a length of this unnecessary bearing, and a number of parts can be reduced as a whole.

In addition, in the motor unit 201 of FIG. 3, a surface perpendicular to the axle direction of the driven gear 234 is flat and no recessed part is formed. In contrast, in the motor unit 1, the first recessed part 35*a* is provided on the surface 34*a* of the driven gear 34, and one end part in the axle inward direction of the bearing part 42 is positioned in the first recessed part 35*a*. Therefore, the length in the axle direction can be further shortened by a length by which one end part of the bearing part 42 is positioned in the first recessed part 35*a*.

Further, in the motor unit 201 of FIG. 3, the output shaft 236 penetrates the driven gear 234 to extend to the axle inward direction side of the driven gear 234. A part of the output shaft 236 positioned at the axle inward direction side of the driven gear 234 is rotatably supported with respect to the housing 10 by a ball bearing 287 arranged inside the housing 10. That is, the motor unit 201 adopts the both-ends-supported structure where the output shaft 236 is supported at both sides of the driven gear 234.

In contrast, the motor unit 1 adopts the cantilever structure where the output shaft 36 is supported only at one side of the driven gear 34. The bearing part 42 has a cylindrical shape by two groups of the rolling elements 40*c*1, 40*c*2 being disposed side by side in the axle direction. Therefore, a contact area (a length in the axial direction) in which the inner race 40*a* is in contact with the output shaft 36 is larger than a contact area of a general bearing (that is, a bearing having only one group of the rolling elements). Therefore, even when the cantilever structure is adopted, the hub bearing 40 can stably support the output shaft 36, and rattling of the output shaft 36 can be suppressed. As a result, it becomes possible to suppress noise and vibration generated due to the rattling of the output shaft 36. Besides, according to this configuration, a number of bearings supporting the output shaft 36 can be reduced in comparison to the both-ends-supported structure. Therefore, the length in the axle direction can be further shortened by a length of the bearing reduced in number, and a number of parts can be reduced as a whole.

Second Embodiment

Next, an in-wheel motor unit 101 according to a second embodiment of the present invention will be described, referring to FIG. 2. Hereinafter, a same reference will be used for a member having a same configuration as the member of the in-wheel motor unit 1 according to the first embodiment, and a detailed description thereof will be omitted.

Figure 2:
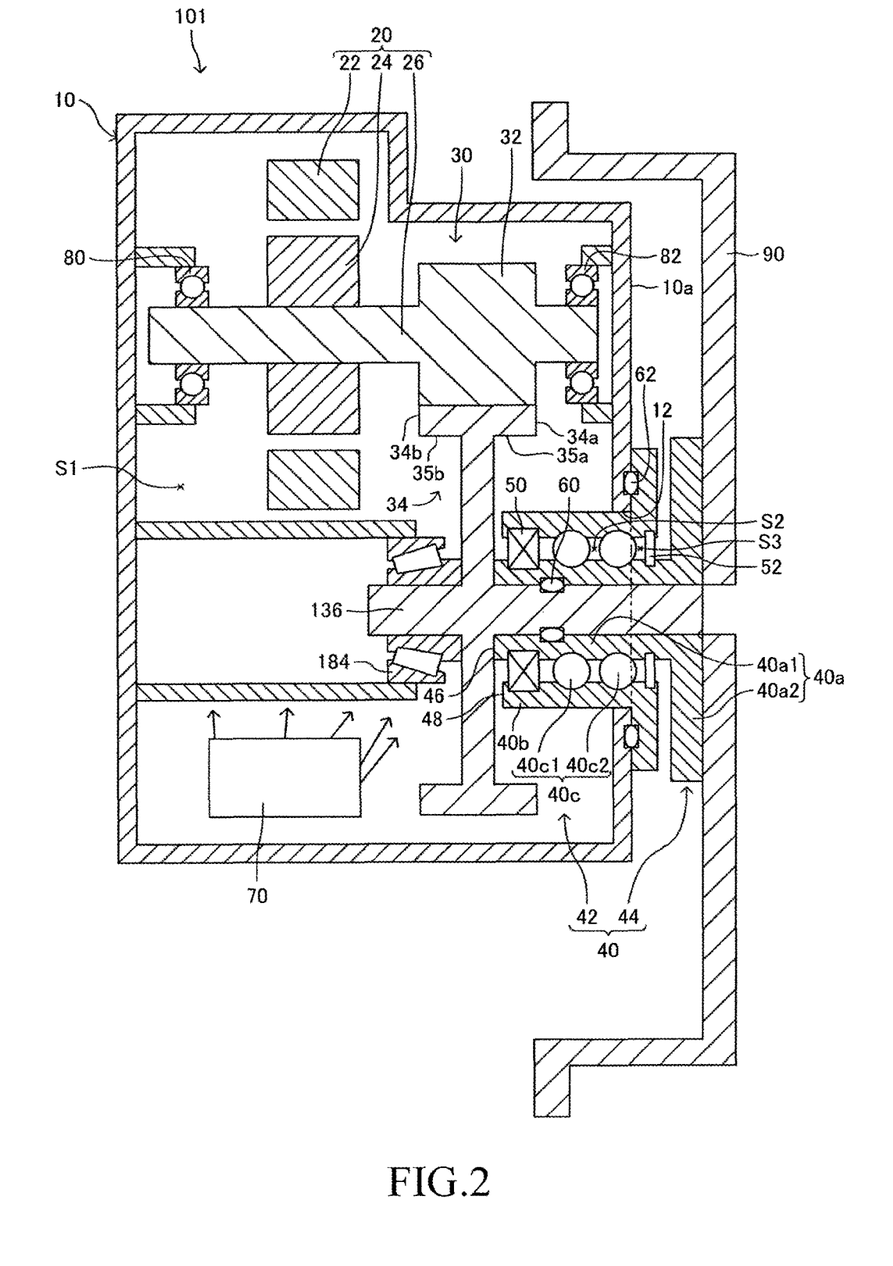
FIG. 2 is a schematic sectional view of an in-wheel motor unit according to a second embodiment of the present invention when seen from the front-rear direction of the vehicle.

As shown in FIG. 2, in the present embodiment, an output shaft 136 penetrates the driven gear 34 to extend to the axle inward direction side of the driven gear 34. An end surface in the axle inward direction of the output shaft 136 is positioned at the axle inward direction side of the surface 34*b* of the driven gear 34. The output shaft 136 is rotatably supported with respect to the housing 10 by a taper roller bearing 184 at the axle inward direction side of the driven gear 34. The taper roller bearing 184 is a bearing where rollers having a truncated cone shape (taper rollers) are used as rolling elements. Preload is applied on the taper roller bearing 184. One end part in the axle outward direction of the taper roller bearing 184 is positioned in the second recessed part 35*b* of the driven gear 34. The taper roller bearing 184 is lubricated by the oil supply apparatus 70.

The motor unit 101 according to the second embodiment also has a unique effect that "a length in the axle direction can be shortened while maintaining a low possibility that a lubricating agent used for the motor unit 101 influences on a brake performance". Further, in this motor unit 101, a part of the output shaft 136 at the axle inward direction side of the driven gear 34 is supported by the taper roller bearing 184. In a case when a type of a bearing supporting the output shaft 136 at the axle inward direction side of the driven gear 34 is a ball bearing, the output shaft 136 is likely to move in its axial direction during operation to cause rattling. However, in this motor unit 101, a taper roller bearing is selected as a type of a bearing supporting the output shaft 136. Therefore, moving of the output shaft 136 in its axial direction can be suppressed, and as a result, the rattling of the output shaft 136 as well as noise and vibration due to the rattling can be suppressed. In addition, rotational vibration of the output shaft 136 can be suppressed by applying the preload on the taper roller bearing 184.

Especially, in the present embodiment, the second recessed part 35b is provided on the surface 34b of the driven gear 34, and one end part in the axle outward direction of the taper roller bearing 184 is positioned in the second recessed part 35b. In general, a taper roller bearing is longer than a ball bearing in length in the axial direction. However, in the configuration above, one end part of the taper roller bearing 184 is positioned in the second recessed part 35b. Therefore, a length in the axle direction can be shortened by a length by which this one end part is positioned in the second recessed part 35b. Therefore, the motor unit 101 can be prevented from becoming longer in the axle direction owing to using the taper roller bearing 184. As a result, suppressing the rattling of the output shaft 136 and preventing the motor unit 101 from becoming longer in the axle direction can be both realized.

The in-wheel motor units according to the embodiments have been described. However, the present invention is not limited to the aforementioned embodiments and may adopt various modifications within a scope of the present invention.

For example, more than or equal to three groups of the rolling elements 40c may be disposed side by side. In addition, rollers may be selected as a type of the rolling elements constituting the groups of the rolling elements 40c.

In the aforementioned embodiment, the first recessed part 35a and the second recessed part 35b are provided on the surface 34a and the surface 34b of the driven gear 34, respectively. However, a configuration is not limited thereto. For example, a configuration where either of the first recessed part 35a or the second recessed part 35b is not provided may be adopted, or a configuration where both of the first recessed part 35a and the second recessed part 35b are not provided may be adopted.

In the aforementioned embodiment, the cylinder part 40a1 of the inner race 40a of the hub bearing 40 is a different member from the output shaft 36. However, the cylinder part 40a1 and the output shaft 36 may be integrated with each other. For example, the cylinder part 40a1 and the output shaft 36 may be integrated by welding or cutting/shaving-out/machining.

In the aforementioned embodiment, the speed reducer 30 only has a reducing mechanism which realizes one stage of deceleration. However, a configuration is not limited thereto. For example, the speed reducer 30 may have a reducing mechanism which realizes two stages of decelerations or more than or equal to three stages of decelerations by further including a reducing mechanism using a planetary gear. Alternatively, a reducing mechanism using a planetary gear may be used instead of the reducing mechanism of the speed reducer 30 in the aforementioned embodiment.

The invention claimed is:

1. An in-wheel motor unit comprising:
a housing supported by a vehicle body and disposed inside a wheel of a vehicle;
a motor supported by said housing and accommodated inside said housing;
a speed reducer including a rotating body with a cylindrical shape configured to be rotated by said motor on an inside of said housing and lubricated by a lubricating oil and an output shaft fixed to or integrated with said rotating body;
a hub bearing provided on a part of said output shaft positioned at an axle outward direction side of said rotating body, allowing a rotation of said wheel while supporting a vehicle weight, and including one or a plurality of groups of rolling elements comprised of a plurality of rolling elements disposed in a circumferential direction thereof; and
a first seal member,
said in-wheel motor unit rotating said wheel by transmitting torque of said motor to said wheel via said speed reducer and said hub bearing,
wherein,
said hub bearing includes a bearing part lubricated by a grease with a higher viscosity than said lubricating oil and a hub part to which a brake rotor disposed outside said housing is fixed, wherein said bearing part and said hub part are integrated with each other,
said housing includes a wall surface on said axle outward direction side, said wall surface expanding on a plane substantially perpendicular to a central axis of said hub bearing,
an opening is provided in said wall surface,
said output shaft penetrates said opening to extend to outside of said housing in an axle outward direction,
said bearing part penetrates said wall surface via said opening and at least a part of said one or a plurality of groups of rolling elements is positioned inside said housing so that a part of said bearing part is positioned on an inside of said housing with respect to said wall surface via said opening,
said part of said output shaft positioned at said axle outward direction side of said rotating body is rotatably supported with respect to said housing only by said bearing part,
a first recessed part recessing in an axle inward direction is provided on one end surface in said axle outward direction of said rotating body,
said first recessed part includes a center of said one end surface and a central axis thereof coincides with a central axis of said rotating body,
one end part in said axle inward direction of said bearing part is positioned in said first recessed part, and
said first seal member is disposed inside said part of said bearing part, fluid-tightly seals a gap between an inner race and an outer race of said hub bearing at a position positioned at an axle inward direction side of said one or a plurality of groups of said rolling elements of said hub bearing, and divides an inside of said housing into a first space where said motor and said rotating body are disposed and a second space surrounded by said inner race, said outer race, said first seal member, and a virtual plane including said opening of said housing.

2. An in-wheel motor unit according to claim 1, wherein, said bearing part has a cylindrical shape where at least more than or equal to two groups of said rolling elements are disposed side by side in an axle direction, said output shaft is supported only by said hub bearing, and a part of said output shaft positioned at said axle inward direction side of said rotating body is not supported by any bearings.

3. An in-wheel motor unit according to claim 1, wherein, a part of said output shaft positioned at said axle inward direction side of said rotating body is rotatably supported with respect to said housing by a taper roller bearing.

4. An in-wheel motor unit according to claim 3, wherein, a second recessed part recessing in said axle outward direction is provided on an other end surface in said axle inward direction of said rotating body, one end part in said axle outward direction of said taper roller bearing is positioned in said second recessed part.

* * * * *